M. PROKSCHL.
COTTON CHOPPER.
APPLICATION FILED APR. 19, 1910.
997,089.
Patented July 4, 1911.
2 SHEETS—SHEET 1.
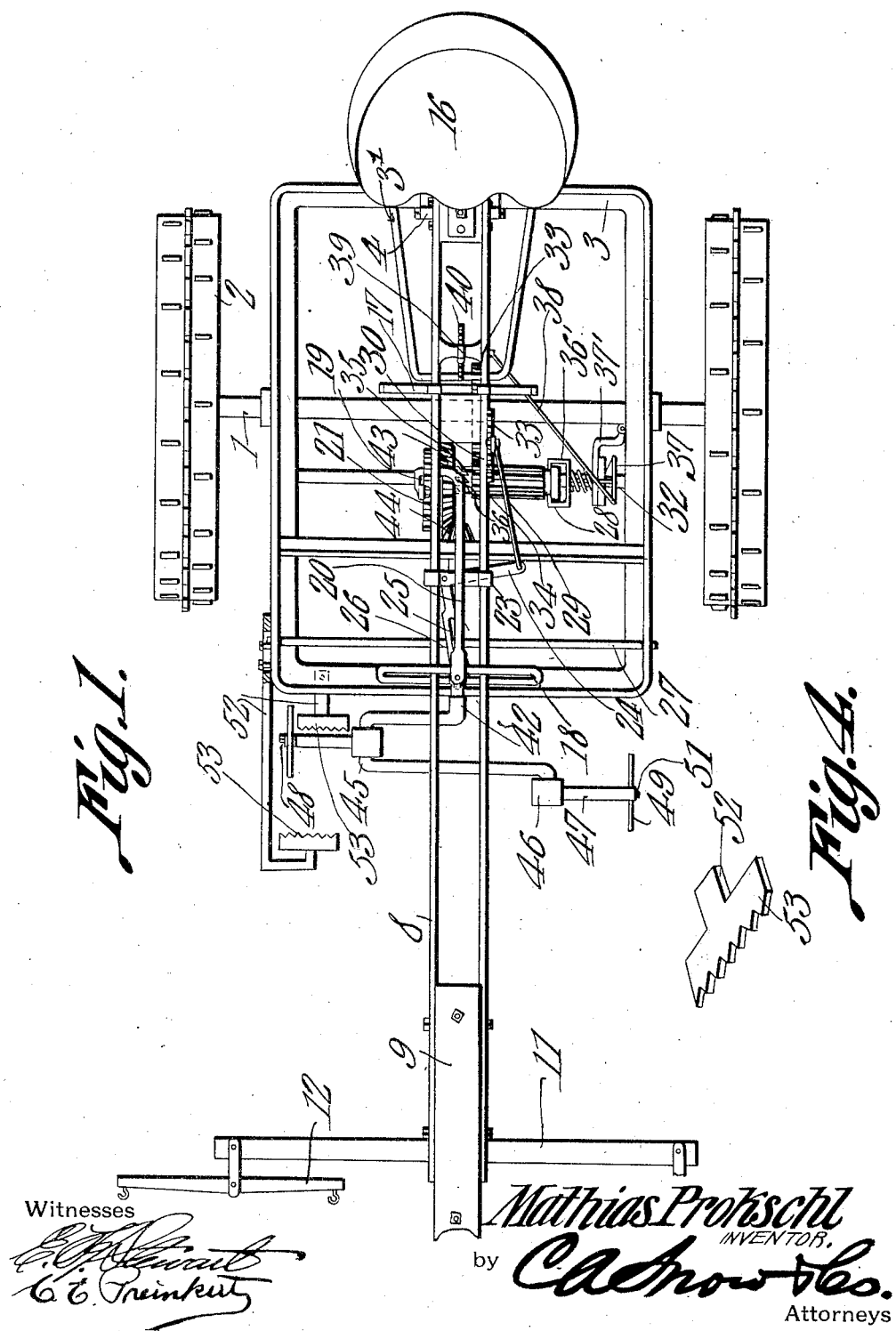
Witnesses
Mathias Prokschl
INVENTOR.
by Snow & Co.
Attorneys M. PROKSCHL.
COTTON CHOPPER.
APPLICATION FILED APR. 19, 1910.
997,089.
Patented July 4, 1911.
2 SHEETS—SHEET 2.
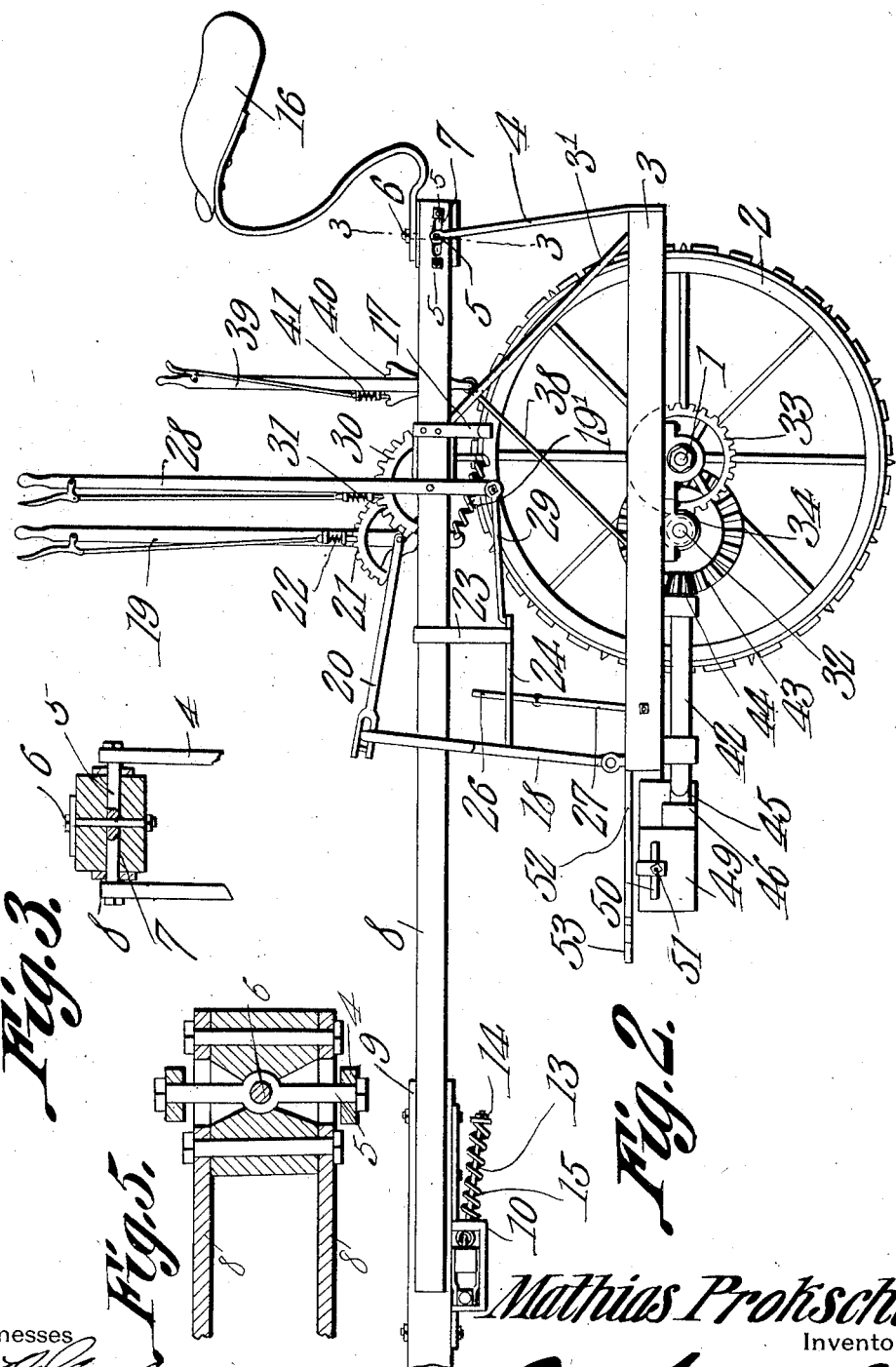
Mathias Prokschl
Inventor.

UNITED STATES PATENT OFFICE.

MATHIAS PROKSCHL, OF ELGIN, TEXAS.

COTTON-CHOPPER.

997,089.  Specification of Letters Patent.  Patented July 4, 1911.

Application filed April 19, 1910. Serial No. 556,334.

*To all whom it may concern:*

Be it known that I, MATHIAS PROKSCHL, a citizen of the United States, residing at Elgin, in the county of Bastrop and State of Texas, have invented a new and useful Cotton-Chopper, of which the following is a specification.

This invention has relation to a cotton chopper and consists in the novel construction and arrangement of its parts hereinafter shown and described.

The principal object of the invention is to provide a cotton chopper with a series of blades adapted to rotate about an axis and so positioned upon the cotton chopper that as the machine progresses along a row of plants the blades will successively operate or chop in the same cut. This is to assure that the operation of the chopper upon the plants in the row will be effective and will assuredly remove the undesirable plants.

With this object in view the chopper includes mechanism whereby the desired end is attained and also includes means whereby the draft tongue of the machine may be swung vertically with relation to the frame thereof and means for turning and holding the frame laterally with relation to the tongue and line of draft of the machine.

In the accompanying drawings;—Figure 1 is a top plan view of the cotton chopper. Fig. 2 is a side elevation of the same with one of the supporting wheels removed. Fig. 3 is a transverse sectional view of a portion of the same cut on the line 3—3 of Fig. 2. Fig. 4 is a detail perspective view of a rake which forms a component part of the cotton chopper. Fig. 5 is a horizontal sectional view of a portion of the cotton chopper.

The cotton chopper consists of an axle 1 which is mounted at its end portions upon traction wheels 2 in the usual manner. A frame 3 is supported upon the intermediate portion of the axle 1 and in turn is provided at its rear end with upwardly disposed standards 4. A cross bar 5 is pivoted at its ends in the upper ends of standards 4 and is provided with an upstanding pin 6 upon which is pivoted a block 7 for lateral swinging movement. The rear ends of bars 8 are secured to the opposite sides of the block 7 and the rear end of a tongue 9 is secured between the forward end of the said bars 8. A bracket 3' is mounted upon the rear side of the frame 3 and the rear portions of the bars 8 normally rest loosely upon the upper edge of said bracket. The bar 5 passes transversely through the block 7 and the rear ends of the bars 8 but there is sufficient play between the parts to permit the block 7 to swing laterally upon the pin 6 as a pivot.

A yoke 10 is secured to the under rear portion of the tongue 9 and a double tree 11 is supported between the intermediate portion of the said yoke 10 and the tongue 9. Swingletrees 12 are carried at the ends of the double tree 11. A bolt 13 is pivotally connected at its forward end with the double tree 11 and passes transversely through the rear portion of the yoke 10 and is provided at its rear end with a nut 14 screw threaded thereon. A coiled spring 15 surrounds the rear portion of the bolt 13 and is interposed between the rear end portion of the yoke 10 and the nut 14 and is under tension with a tendency to hold the said bolt and its attachment in a rearward position with respect to the said yoke 10. By this arrangement it will be seen that when draft animals are attached to the swingletrees 12 and the machine is drawn along a row of plants and the chopping blades (to be described presently) are in operation that the spring 15 and bolt 13 and its attachment will operate as a shock absorber and in a great measure will relieve the draft animals of the shock due to the force of impact as the chopping blades successively come in contact with the soil.

An operator's seat 16 is mounted upon the block 7 at the rear end portion of the machine and stirrups 17 are attached to the side bars 8 just in advance of the said seat 16. A yoke 18 is pivotally connected with the forward portion of the frame 3 and at its intermediate portion extends over the intermediate portion of the side bars 8. A lever 19 is fulcrumed upon one of the side bars 8 and is provided with a crank extremity 20 which engages the intermediate portion of the said yoke 18. A coiled spring 19' is connected at one end to the lower end of said lever and at its other end with a pin carried by one of the bars 8 and is designed to assist in swinging the said lever upon its fulcrum. A gear segment 21 is also mounted upon one of the side bars 8 adjacent the lower end of the lever 19 and is adapted to be engaged by a spring actuated pawl 22 carried by the said lever. By this arrangement it will be seen that by swinging the lever 19 that the crank 20 thereof will be swung about an axis and the yoke 18 will be moved transversely of the bars 8. This will have the effect of swinging the forward portion of the frame 3 in an upward or downward direction according to the direction in which the lever 19 is swung. Therefore means is provided for raising or lowering the chopping mechanism (to be explained) which is located at the forward portion of the said frame 3. A bracket 23 depends from the intermediate portions of the side bars 8 and a bell crank lever 24 is fulcrumed upon the said bracket. The bell crank lever 24 is provided at its forward end with an elongated slot 25 which loosely receives an upstanding rod 26 fixed at its lower end to a cross rod 27. The said cross rod 27 is secured at its ends to the opposite sides of the frame 3. A lever 28 is fulcrumed upon one of the side bars 8 and the working end of the said lever is operatively connected by means of a link 29 with the rear end of the bell crank lever 24. A gear segment 30 is mounted upon one of the side bars 8 and is adapted to be engaged by a spring actuated pawl 31 carried by the lever 28. By this arrangement it will be seen that by swinging the lever 28 the bell crank lever 24 will be rocked upon its fulcrum and through the upstanding rod 26 and cross rod 27 the forward portion of the frame 3 will be swung to one side or the other with relation to the line of draft of the machine and the disposition of the tongue 9 thereof. When there is such lateral swinging movement the frame 3 turns upon the pin 6 as a pivot and when the forward portion of the frame is swung in an upward or downward direction the swinging movement occurs upon the cross bar 5 as a pivot. The advantage gained by providing means for swinging the forward portion of the frame to one side or the other is that the machine may be used to advantage for operating upon hill sides.

A shaft 32 is journaled in the frame 3 in advance of the axle 1 and a gear wheel 33 is fixed to the intermediate portion of the said axle. The gear wheel 33 meshes with an elongated gear wheel 34 which is slidably mounted upon the shaft 32 and which is provided with a clutch hub 35. A clutch member 36 is journaled upon the shaft 32. Any suitable device may be used for moving the wheel 34 longitudinally of the shaft 32 and as illustrated in the drawings such device consists of a cam disk 37 mounted upon the shaft 32 and which bears at its cam face against a stop 37'. One end of a link 38 is pivotally connected with the disk 37 and the other end of the said link is pivotally connected with a lever 39 which is fulcrumed upon one of the side bars. A gear segment 40 is also mounted upon one of the side bars 8 and is adapted to be engaged by a spring actuated pawl 41 carried by the lever 39.

Thus it will be seen that by swinging the said lever 39 that through the connecting link 38 the disk 37 will be turned so that the cam face of the disk is moved below the stop 37' and thus a yoke and spring indicated at 36' may come into play and move the clutch into engagement with the clutch member 36.

A crank shaft 42 is journaled for rotation at the forward portion of the frame 3 and is located at a right angle to the shaft 32 above described. A beveled gear wheel 43 is fixed to the clutch member 36 and meshes with a beveled pinion 44 fixed to the rear end of the shaft 42.

As illustrated in Fig. 1 of the drawings the shaft 42 is provided with two adjacent cranks 45 at the extremities of which are fixed blocks 46. Each block 46 is provided with a radially disposed arm 47 having at its outer end an angularly disposed extremity 48. Chopping blades 49 are provided with elongated slots 50 which are adapted to receive bolts 51 which also pass transversely through the angularly disposed extremities 48 of the arm 47. By this arrangement it will be seen that the chopping blades 49 may be shifted longitudinally of their lengths upon the extremities 48 of the arm 47 and fixed by means of the bolt 51 in adjusted position thereon.

From the above description it will be seen that as the machine is drawn along a row of plants rotary movement is transmitted from the axle 2 through the intermeshing gear wheels 33 and 34 to the shaft 32 when the clutch member 36 is in engagement with the clutch hub 35 of the said wheel 34. From the shaft 32 rotary movement is transmitted through the intermeshing gear wheel 43 and pinion 44 through the shaft 42. Therefore as the cranks 45 and the chopping blades 49 rotate about the axis of the shaft 42 the said blades successively come in contact with the ground and chop out undesirable plants. The parts of the machine are so arranged and geared that the chopping blade 49 located upon the hindmost crank 45 will chop or operate in the cut which has previously been made in the soil by the chopping blade 49 mounted upon the foremost crank 45 of the shaft 42. That is to say said blades throughout the major portions of their lengths operate upon the soil at the same point or section and the object of this is that the foremost blade engages the soil to remove the major portions thereof to be removed during the cutting operation but should it fail to effectually chop out all of the plants the plants left standing in the cut will assuredly be removed by the next blade in its succeeding operation upon the soil at the same point or section in the row.

Arms 52 are adjustably mounted at one side of the frame 3 and carry at their forward ends rakes 53 which may be so positioned with relation to the side of the frame at which the chopping blades 49 travel upward that should the soil or roots of plants adhere to the said blades they will be thrown in contact with the rakes 53 and as the blades continue in their movement the soil or roots will be arrested by the said rakes and detached from said blades and permitted to fall to the surface of the ground.

Having thus described the invention what is claimed is:—

A cotton chopper comprising a wheel mounted frame, a tongue pivotally connected with the frame, means for swinging the frame vertically with relation to the tongue, means for swinging the frame laterally with relation to the tongue consisting of a cross bar attached to the frame, a vertically disposed rod attached to said cross bar, a bell crank lever fulcrumed above the frame and having an elongated slot which receives the vertically disposed rod, and means for swinging said bell crank lever.

In testimony that I claim the foregoing as my own, I have hereto affixed my signature in the presence of two witnesses.

MATHIAS PROKSCHL.

Witnesses:
J. T. PREUITT,
A. H. DAVIS.

---

Copies of this patent may be obtained for five cents each, by addressing the "Commissioner of Patents, Washington, D. C."